US 8,037,261 B2

(12) United States Patent
Herndon et al.

(10) Patent No.: US 8,037,261 B2
(45) Date of Patent: Oct. 11, 2011

(54) CLOSED-LOOP SYSTEM FOR DYNAMICALLY DISTRIBUTING MEMORY BANDWIDTH

(75) Inventors: Steven B. Herndon, Endicott, NY (US); David A. Hrusecky, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 3692 days.

(21) Appl. No.: 10/170,145

(22) Filed: Jun. 12, 2002

(65) Prior Publication Data

US 2003/0233662 A1 Dec. 18, 2003

(51) Int. Cl.
*G06F 13/28* (2006.01)
(52) U.S. Cl. ........ 711/158; 711/147; 711/151; 711/154; 710/41; 710/244; 725/151
(58) Field of Classification Search .................. 711/147, 711/151, 153, 154, 158, 159; 725/151, 152, 725/153; 710/40, 41, 60; 375/240.25
See application file for complete search history.

(56) References Cited

U.S. PATENT DOCUMENTS

| | | | |
|---|---|---|---|
| 5,874,995 A | 2/1999 | Naimpally et al. | |
| 5,982,360 A | 11/1999 | Wu et al. | |
| 6,055,577 A * | 4/2000 | Lee et al. | 709/233 |
| 6,205,524 B1 * | 3/2001 | Ng | 711/151 |
| 6,240,492 B1 | 5/2001 | Foster et al. | |
| 6,393,505 B1 * | 5/2002 | Scalise et al. | 710/107 |
| 2001/0052130 A1 * | 12/2001 | Yap et al. | 725/90 |

FOREIGN PATENT DOCUMENTS

| | | |
|---|---|---|
| EP | 0 697 794 A2 | 2/1996 |
| WO | WO 01/45425 A1 | 6/2001 |

OTHER PUBLICATIONS

"Data Width and Format Conversion Subsystem for a Graphics Coprocessor," IBM Technical Disclosure Bulletin, vol. 33 No. 3A, Aug. 1990.
Subrahmanyam, P.A., Sharma, A., "Issues in developing real-time multimedia applications for a multiprocessor system," Proceedings of the 4th International Workshop on Parallel and Distributed Real-Time Systems, Apr. 15-16, 1996, pp. 147-155.
Jaspers, E.G.T., de With, P.H.N., "Architeccture of embedded video processing in a multimedia chip-set," 1999 International Conference on Image Processing, Oct. 24-28, 1999, vol. 2, pp. 787-791.

* cited by examiner

*Primary Examiner* — Pankaj Kumar
*Assistant Examiner* — Timothy Newlin
(74) *Attorney, Agent, or Firm* — Ian D. MacKinnon; Hoffman Warnick LLC (57) ABSTRACT

A closed-loop system for dynamically distributing memory bandwidth between real-time components and non-real-time components is provided. Specifically, the present invention includes monitors for measuring a performance of each of the real-time components. Based on the measured performance, closed-loop feedback loop is communicated to a unified memory system. The feedback is used by the memory controls within the unified memory system to efficiently and dynamically distribute memory bandwidth between the real-time and the non-real-time components.

20 Claims, 5 Drawing Sheets

CLOSED-LOOP SYSTEM FOR DYNAMICALLY DISTRIBUTING MEMORY BANDWIDTH

BACKGROUND OF THE INVENTION

1. Field of the Invention

The present invention generally relates to a closed-loop system for dynamically distributing memory bandwidth. More specifically, the present invention relates to a closed-loop system for dynamically distributing memory bandwidth between real-time components and non-real-time components based on a measured progress of the real-time components.

2. Background Art

In providing content such as video and audio data in a digital format, digital signals are often transmitted to a Set-Top Box (STB). Typical applications in which a STB is utilized include digital cable television and satellite television. In general, set-top boxes include highly integrated chips developed using System-on-a-Chip (SOC) methodology. The components of the SOC rely on a unified memory architecture to provide the most cost effective memory subsystem. Such an architecture, however, leads to a mixture of functional components that have real-time requirements and functional components that have non-real-time requirements. With such a mixture, the memory allocation between the real-time components and the non-real-time components must be carefully balanced to ensure the functionality thereof is satisfied.

Heretofore, the functionality of the components has been satisfied using an open-loop architecture that provides sufficient excess performance such that all real-time demands are met. This approach has been generally acceptable for low performance components, which may have sufficient memory subsystem performance for the real-time components and very few demands placed on non-real-time components. Unfortunately, for higher functionality components, the open-loop architecture leads to higher cost and/or components of the chip not receiving as much memory allocation as is needed.

In addition, as more demands are placed on the components of a SOC, it as advantageous to maximize the efficiency of the memory subsystem wherever possible. As such, the memory controller may take into account access patterns in its selection of operations to perform. By increasing the efficiency of the memory subsystem, more total work is done by the system for a given memory technology, bus frequency and width. If the entire system has non-real-time demands, then the functional components and memory subsystem could be run entirely open-loop. However, in the case of a STB having real-time components such as video display and decoding, specific deadlines would be missed. Missed deadlines result in unpleasant artifacts such as repeated pictures, audio pops, or visual streaks. Such artifacts are undesirable and may render the STB noncompetitive.

One alternative to open-loop components is to raise the priorities of the real-time components over the non-real-time components so that all real-time deadlines are met. Unfortunately, this wastes bandwidth and thus, useful work since the memory subsystem may not be as efficient since it must be "reserved" for the real-time components. Another alternative is to use a higher frequency or wider memory components to deliver excess bandwidth. As is well known, however, excess memory bandwidth is accompanied with higher costs, which can render the STB noncompetitive in the marketplace. In addition, many existing systems have priority controls that are hard coded or statically defined based on a-priori assumptions on workload. The priority input is generally based on a very fine scale such as the individual bus command or over several commands. Accordingly, no "global" dynamic analysis is performed.

In view of the foregoing, there exists a need for a closed-loop system for dynamically distributing memory bandwidth between real-time components and non-real-time components. A further need exists for a system in which a performance of the real-time components is measured. In addition, a need exists for closed-loop feedback to be provided to a unified memory system so that the memory bandwidth can be distributed with optimal efficiency.

SUMMARY OF THE INVENTION

In general, the present invention provides a closed-loop system for dynamically distributing memory bandwidth between real-time components and non-real-time components from a unified memory system. Specifically, the present invention measures a performance of each of the real-time components. Based on the measured performance(s), feedback loop(s) are communicated to the unified memory system. The feedback loops allow the unified memory system to efficiently distribute memory bandwidth between the real-time and the non-real-time components.

According to a first aspect of the present invention, a system for dynamically distributing memory bandwidth is provided. The system comprises: (1) a memory system; (2) a real-time component communicating with the memory system; (3) a non-real-time component communicating with the memory system; and (4) a component monitor for measuring a progress of the real-time component and for providing feedback based on the progress to the memory system, wherein the feedback is used to distribute memory bandwidth between the real-time component and the non-real-time component.

According to a second aspect of the present invention, a closed-loop system for dynamically distributing memory bandwidth between a real-time component and a non-real-time component is provided. The system comprises: (1) a unified memory system having memory controls; (2) a plurality of real-time components communicating with the unified memory system; (3) a non-real-time component communicating with the unified memory system; and (4) a plurality of component monitors, wherein each of the plurality of component monitors measures a progress of one of the plurality of real-time components and provides feedback based on the progress to the unified memory system, and wherein the feedback is processed by the memory controls to distribute memory bandwidth between the real-time components and the non-real-time component.

According to a third aspect of the present invention, a closed-loop system for dynamically distributing memory bandwidth between real-time components and non-real-time components is provided. The system comprises: (1) a unified memory system having memory controls; (2) a real-time video display component, a real-time video decoding component, and at least one non-real-time component communicating with the unified memory system; (3) a display component monitor for measuring a display progress of the real-time video display component, and for providing display feedback based on the display progress to the unified memory system; (4) a decoding component monitor for measuring a decoding progress of the real-time video decoding component, and for providing decoding feedback based on the decoding progress to the unified memory system; and (5) wherein the display feedback and the decoding feedback are processed by the memory controls to distribute memory bandwidth between the real-time video display component, the real-time video decoding component and the at least one non-real-time component.

Therefore, the present invention provides a system for dynamically distributing memory bandwidth between real-time components and non-real-time components.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a closed-loop system for dynamically distributing memory bandwidth. Typically, the present invention is implemented as a System-on-a-Chip (SOC) in a Set-Top Box (STB). The present invention ensures that the memory bandwidth is efficiently distributed between real-time components and non-real-time components without damaging the integrity of the results produced by either the real-time components or the non-real-time components.

As used herein, STB is intended to refer to any device capable of receiving a digital signal, such as a cable or satellite television box. Moreover, memory bandwidth as referred to herein is the amount of data transferred between the memory controller and the requesting component in any amount of time. To this extent, it should be understood that bandwidth as distributed hereunder is variable and could be any percentage of peak or total bandwidth.

Figure 1:
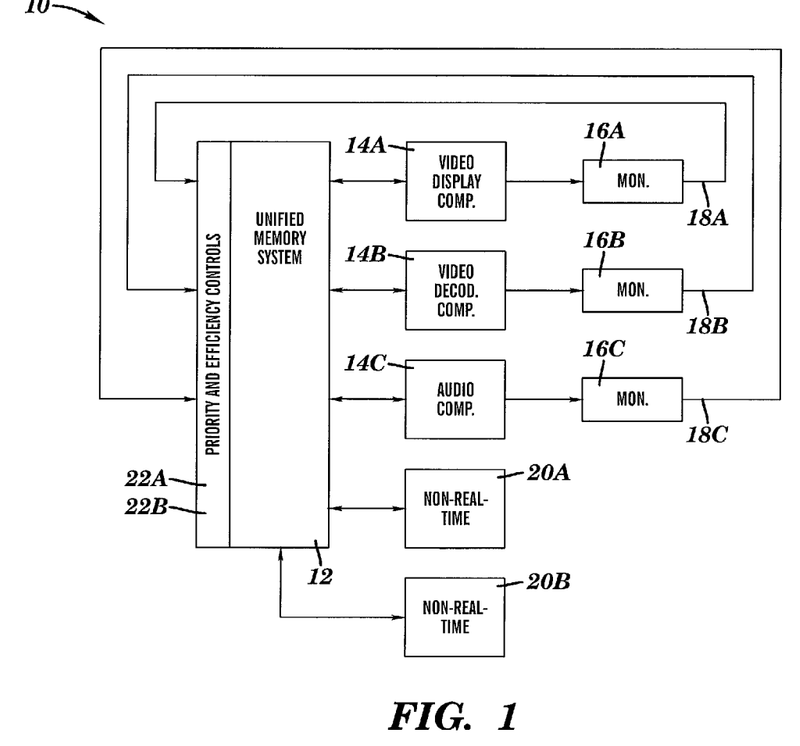
FIG. 1 depicts a closed-loop system for dynamically distributing memory bandwidth according to the present invention.

Referring now to FIG. 1, a closed-loop system 10 according to the present invention is shown. As depicted, closed-loop system 10 includes unified memory system 12, real-time components 14A-C, real-time component monitors 16A-C and non-real-time components 20A-B. As will be further described below, unified memory system 12 generally includes memory controls 22A-B, a unified memory controller (not shown) and memory such as SDRAM chips (not shown). In a typical embodiment, memory controls 22A-B include priority controls 22A, efficiency controls 22B, or both priority and efficiency controls 22A-B (which could be provided as a single unit as shown and described below in conjunction with FIG. 5). It should be understood that the quantity of components 14A-C and 20A-B shown herein is illustrative only and is not intended to be limiting.

Real-time components are systems that must perform some functions by a particular time deadline. As shown, exemplary real-time components 14A-C include video display component 14A, video decoding component 14B (e.g., MPEG, motion JPEG, etc.) and audio component 14C. These components 14A-C are generally utilized when receiving and processing a digital data signal. For example, a digital cable television signal received by a STB will have both video and audio data. Video display component 14A is responsible for processing the video data to display the video images. Video decoding components 14B is responsible for decoding the video data. Specifically, the data is transmitted to the STB as a digital signal. Video decoding component 14B allows the data to be decoded into usable data. Audio component 14A processes the received audio data to produce the sound that accompanies the images. Non-real-time components 20A-B are intended to be representative of systems such as peripherals, a host CPU, graphics render, etc. that perform functions with no specific deadlines. It should be appreciated that specific real-time components (e.g., video display 14A, video decoding 14B and audio 14C) have been shown for illustrative purposes only and that memory bandwidth could be distributed to other real-time components under the present invention.

As indicated above, it is important for real-time components 14A-C to perform their functions according to their allotted time deadlines. Moreover, the deadlines must be met while dedicating as much memory bandwidth as possible to non-real-time components 20A-B. If real-time systems begin to fall behind, artifacts such as repeated pictures, audio pops, or visual streaks could be experienced. Accordingly, memory bandwidth from unified memory system 12 must be efficiently distributed between real-time components 14A-C and non-real-time components 20A-B such that performance by all components is optimized. That is, memory bandwidth can be directed away from over-supplied components and distributed to under-performing components by memory controls 22A-B. In a typical embodiment, memory bandwidth is directed away from non-real-time components 20A-B and distributed to under performing real-time components 14A-C based on a measured performance of the real-time components 14A-C.

It should be appreciated that the memory bandwidth required by video display component 14A and video decoding component 14B is generally greater than audio component 14C. Accordingly, allocation of memory bandwidth to video display component 14A and video decoding component 14B may be more active than to audio component 14C.

To provide efficient memory bandwidth allocation among components 14A-C and 20A-B, real-time components 14A-C are in communication with real-time monitors 16A-C, which monitor a progress of each real-time component 14A-C. Generally, this progress is based on a quantity of internal memory banks (FIFOs) within video display component 14A that are filled with video data. Feedback 18A based on the measured progress of video display component 14A will then be provided to unified memory system 12. If video display component 14A is behind in performance, memory controls 22A and/or 22B—(which are further described in detail below) will ensure that more memory bandwidth is distributed thereto by unified memory system 12. Similarly, video decoding monitor 16B will measure a progress of video decoding component 14B. In this case, progress is based on a quantity of macroblocks produced during signal decoding, and provide feedback 18B is provided based thereon. If the quantity of macroblocks produced falls behind expectations, video decoding component 14B will be distributed additional memory bandwidth. Audio monitor 16C functions in a similar manner. Specifically, audio monitor 16C will provide feedback 18C that is based on a progress of audio component 14C. If audio component 14C is behind in expected audio generation, unified memory system 12 will distribute additional memory bandwidth.

Figure 2:
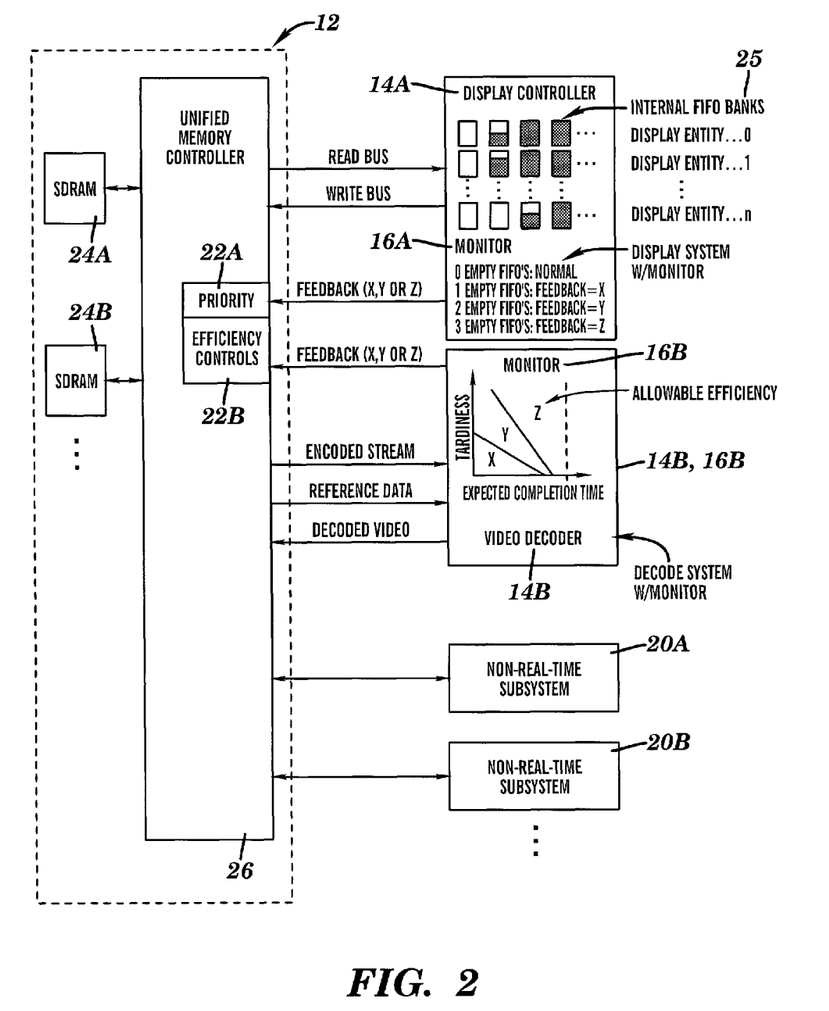
FIG. 2 depicts a more detailed diagram of the system of FIG. 1.

Referring now to FIG. 2, a more detailed diagram of the system of FIG. 1 without audio component 14C and audio monitor 16C is shown. As depicted, video display component 14A and video display monitor 16A are shown as a single unit. Similarly, video decoding component 14B and video decoding monitor 16B are shown as a single unit. As indicated above, component monitors 16A-B measure a progress of components 14A-B, respectively, and provide feedback based thereon. The feedback is received and processed by priority and efficiency controls 22A-B within unified memory controller 26. In a typical embodiment, memory controls 22A and/or 22B cause unified memory controller 26 to dynamically distribute memory bandwidth from memory (chips) 24A-B among components 14A-B and 20A-B.

In general, efficiency controls 22B are used to minimize the constraints on memory system 12. To this extent, efficiency controls 22B are not hard coded or statically defined based on a-priori assumptions of workload like the controls in previous systems. Ideally, the constraints are minimized for the maximum amount of time so that unified memory controller 26 with efficiency controls 22B can optimize for maximum efficiency. In a system having only non-real-time components, constraints are of little concern. However, when implementing system 10 having both real-time components 14A-C and non-real-time components 20A-B, minimizing the constraints in accordance with the present invention will increase the available memory bandwidth. In general, the efficiency of a memory controller is the amount of actual data transferred relative to the maximum amount of data that could be transferred for any given clock speed, bus width and memory technology (referred to as peak bandwidth). As indicated above, the amount of memory bandwidth actually available is typically less than the peak bandwidth due to memory technology constraints (e.g., refresh, bank active/close operations for DRAM, control protocol constraints, controller design, etc.). A unified memory controller 26 with efficiency controls 22B may implement methods to increase the data transfer efficiency by utilizing state information internal to the memory controller such as page history and reorder or arbitrate requests in such an order that maximizes efficiency (useful data bandwidth) by reducing or overlapping control cycles (as will be further described below in conjunction with FIG. 5).

As further shown in FIG. 2, video display component 14A is typically implemented as an imbedded memory element, logically divided up into a number of smaller areas, or banks shown as first-in-first outs (FIFO's) 25. Based on a quantity of banks that are filled with video data, feedback is provided (e.g., a sliding scale). Typical quantities of banks 25 are two or four, based on a power of two division. As shown in FIG. 2, four logical banks 25 are first pre-filled during a period of relative inactivity. This period is usually found during the horizontal retrace time of every line required by video display component 14A. The goal is such that all of the display component's 14A internal imbedded banks 25 are filled by the end of this retrace period. During the active video portion of a line, this data begins to be consumed, indicated by the light areas of the banks 25 (dark=fullness). In this embodiment, it is assumed that a single bank 25 being empty is a regular event, and feedback set to "X" may induce no special response from memory controls 22A and/or 22B. Thus, system 10 could remain in a normal (e.g., pure bandwidth) mode. Conversely, two banks 25 being empty could be more of a concern, but still within the realm of normalcy, and a feedback set to "Y" may induce some minor, non-blocking response from memory controls 22A and/or 22B, enough to curtail the lateness trend. Specifically, memory controls 22A and/or 22B will cause unified memory controller 26 to distribute some minor amount of additional memory bandwidth from memory 24A-B to video display system 14A. Because the bandwidth consumption of video display system 14A is a relatively smooth uniform drain on the memory system, it is assumed that the lateness trend now being noticed by video display monitor 16A is a result of some other bandwidth load (CPU, Graphical, DMA, Video decoder, etc.), and may in the short run complete its need for this bandwidth load. Thus, it is assumed that no drastic action need be taken yet. Three banks 25 being empty, however, could be a strong indication of impending problems, given that video display system 14A is now consuming data from its last pre-filled bank. Under these conditions a feedback set to "Z" may induce some major response from the memory controls 22A and/or 22B, enough to reverse the lateness trend, and further, to allow the banks to fill back up to some comfortable level of operation. This may include path blocking, such that video display system 14A has a momentary dedicated access to the memory system 12. It should be understood that the present invention is not limited to the three "incremental" conditions described above. Rather, the present invention could apply to any increment on a sliding scale of conditions and associated feedback. In any event, a goal of the present invention is to stay in low constraint mode so as to maximize the available memory bandwidth.

Video decoding monitor 16B will be described in more detail with respect to FIG. 3. In general, video decoding monitor 16B measures the progress of video decoding system 14B based on a quantity of macroblocks produced in a certain time during decoding. Similar to the video display system 14A, the memory bandwidth could be distributed on a sliding scale (e.g., pure bandwidth, non-blocking and data blocking) so that a small quantity of macroblocks of lateness could invoke no response, whereas a large quantity could invoke a large response. In general, video decoding monitor 16B is responsive to the progress of video decoding system 14B with a much larger time scale than video display monitor lad 16A (e.g., milliseconds rather than microseconds). For example, a video decoding operation in NTSC mode requires that a frame of encoded video be decoded in less than 33 ms in order to keep the video presentation free of frame related artifacts, such as skipping of some frames in order to keep pace with the incoming video stream. Also, the bandwidth required to drive a single video decoder is substantially less than the bandwidth needed to drive a high function, multi-plane display unit. Thus, since it is the responsibility of a monitor to maintain frugal control over use of the feedback signal, video decoding monitor 16B can give video decoding system 14B some leeway in the decoding progress of any one picture.

Figure 3:
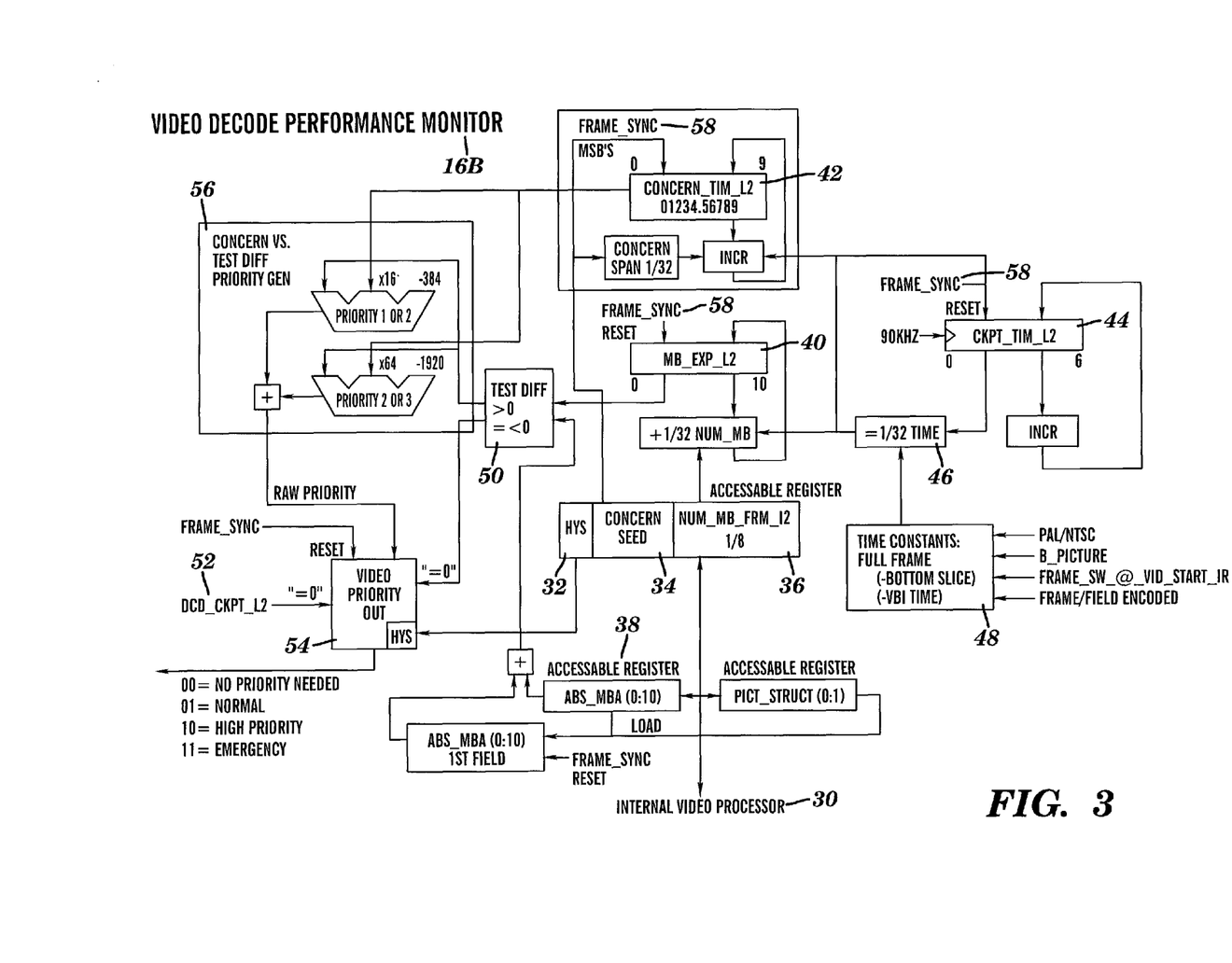
FIG. 3 depicts a more detailed diagram of the video decoding monitor of the system of FIG. 1.

Referring now to FIG. 3, a more detailed depiction of video decoding monitor 16B is shown. Initially, internal video processor 30 initializes the accessible registers at chip reset time to set the hysteresis 32 and Concern Seed 34 to values arrived through imperical measurement or simulations. The process for each frame begins when the internal video processor initializes the other accessible registers. Prior to decoding any part of the picture, absolute MBA register 38, which reflects the total quantity of macroblocks decoded, will be reset to zero. The picture structure is set to indicate field or frame picture decoding. At the beginning of a MPEG sequence, the size of the incoming picture is resolved down to a quantity of macroblocks expected to complete the decoding of the picture on a frame basis, known here as "Num_MB_frm_L2" 36. The "MB_exp_L2" 40, "Concern_Tim_L2" 42 and "Ckpt_Tim_L2" 44 registers are reset to zero at the beginning of the frame time, marked by a "frame_sync pulse" 58. Video decoding monitor's 16B actions are based on the timing of time counter "Ckpt_Tim_L2" 44, which is clocked with a fixed timing pulse (e.g., in this case 90 khz is readily available in a MPEG video system). Specifically, the time counting is divided into thirty-two events per frame. This is based on the total times expected per frame based on Time Constant input variables (e.g., b_picture, field/frame_encoded pictures NTSC=0.0333333 sec/PAL=0.04 sec for full frame time, etc.). Thirty-two is a relatively simple division, achievable by shifting. Similarly "Concern_Tim_L2" counter 42 is increased in a linear fashion, added to 1/32 of the difference of the "Concern_seed" 34 (a value 0 to 31) to the Difference of 32—"Concern_seed" 34 (know as the Concern Span). Thus, "Concern_Tim_L2" counter 42 increases in a linear fashion as depicted in FIG. 4A.

For every 1/32 time pulse from the Time Constant divider, a 1/32 portion of the value of "Num_MB_frm_L2" 36 is added to the "MB_exp_L2" value 40. Thus, "MB_exp_L2" value 40 increases linearly throughout the frame. As macroblocks are produced by video decoding system 14B, the value of "abs_MBA" 38 will increase, one per macroblock. Based on frame structure, it is determined whether this value will be used alone (frame picture structure) or combined with a value saved from the production of the previous field (field picture structure). In either event, this value is tested via "Test Diff" 50 with the expected value. One output, marked as "=<0", indicates that macroblock production is on schedule, and no priority action be taken. The other, ">0" indicates that macroblock production is behind schedule, and feeds the difference into a circuit that essentially implements an algebraic slope intersection function. The workings of this function is better described graphically in conjunction with FIG. 4B, which will be further discussed below. The amount of lateness of a particular value is magnified by the "Concern_Tim_L2" value 42, and is input into this algebraic function. Accordingly, the closer in time to the deadline (i.e., the 32'd time slice), the more concern about the quantity of macroblocks that the decoding operation is behind. Moreover, the higher the concern seed, the sooner any one value of macroblock tardiness will be translated into more extreme corrective action in the memory system. The output of this is a multi-bit signal that is resolved down to a stable signal with hysteresis means. The arrival of a "Dcd_Ckpt_L2" signal 52 indicates that the video decoder has determined that the picture decode is completed, and no matter what the state of the priority signal to the memory (00, 01, 10, 11), a value of 00 should now be sent because the need for memory by the video decoding system 14B is complete for this frame period.

Figure 4A:
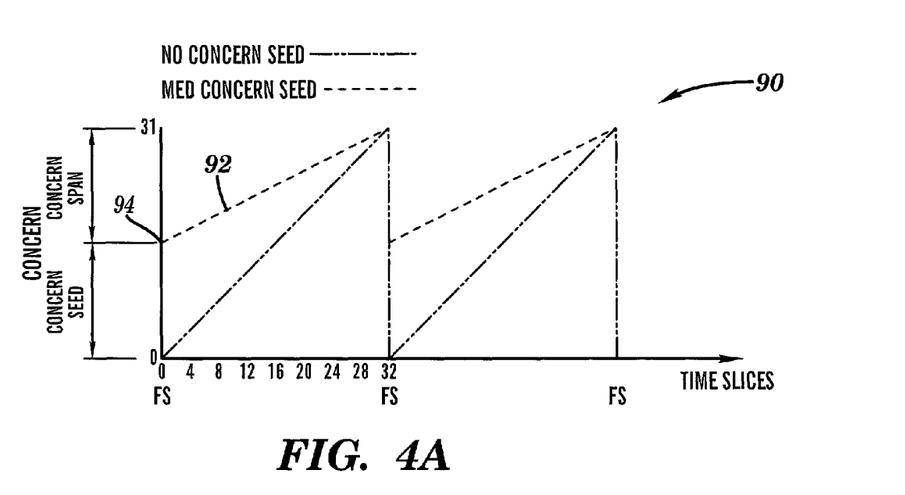
FIG. 4A depicts an exemplary graph of performance by a concern counter utilized by the video decoding monitor of FIG. 3.

Referring now to FIG. 4A, graph 90 depicting "Concern_Tim_L2" counter 42 is shown. As depicted, "Concern_Tim_L2" counter 42 increases in a linear fashion with respect to "concern" vs. "time slices." Referring to curve 92 representing medium concern seed, "concern seed" is measured by the difference between value 94 along the concern axis (i.e., the Y axis) at which the curve begins, and zero. As shown, the concern seed is approximately sixteen. Since the concern span is measured by the difference between the concern seed and thirty-two, the concern span is also approximately sixteen.

Figure 4B:
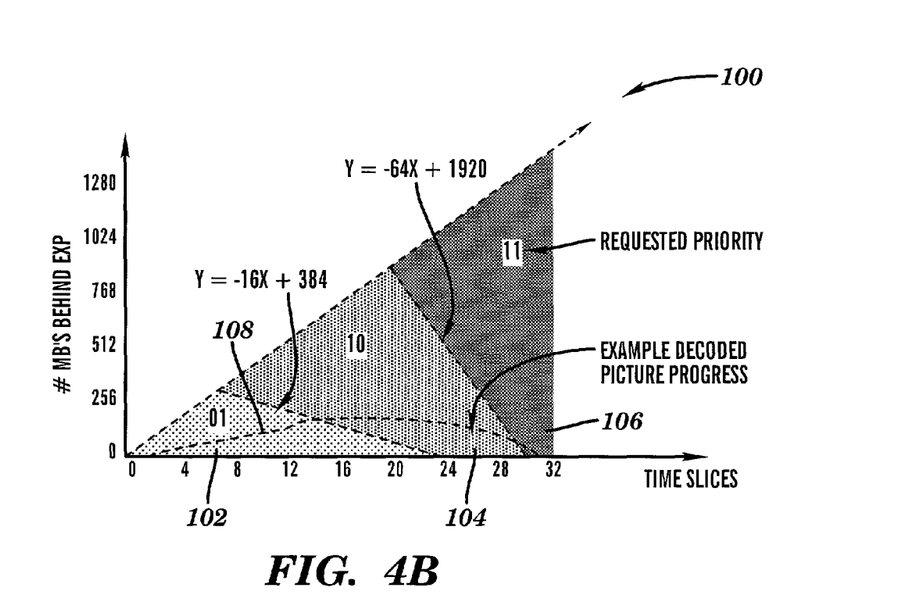
FIG. 4B depicts an exemplary graph of performance for a video signal decoding operation.

Referring now to FIG. 4B, a graph 100 of progress vs. time slices is shown. Specifically, graph 100 depicts the quantity of macroblocks behind expectations vs. time for video decoding component 14B, as measured by video decoding monitor 16B. As shown, graph is segmented into three distinct regions 102, 104 and 106. Moreover, the borders between regions 102, 104 and 106 are formed according to the equations "y=−16x+384" and "y=−64X+1920," which should be understood to be exemplary only. Curve 108 represents an exemplary performance of video decoding component 14B. As shown, the performance of video decoding component 14B enters all three regions 102, 104 and 106. As indicated above, a small amount of lateness could be tolerated without distributing additional memory bandwidth. For example, performance by video decoding component 14B that falls within region 102 could be within the acceptable limits. Such performance could result in a feedback of "X," meaning the no action need be taken (similar to feedback "X" for video display component 14A). Conversely, performance that falls within region 104 could be considered minor under performance and could produce feedback signal "Y" that results in a small amount of additional memory bandwidth being distributed. However, performance that falls within region 106 (i.e., closer to the time deadline) could be considered severe under performance, and could result in feedback signal "Z" that induces significant additional memory bandwidth distribution.

As indicated above, memory controls 22A and/or 22B could be implemented under the present invention to receive and process feedback 18A-C from real-time systems 14A-C, and dynamically distribute memory bandwidth based thereon. Unlike memory controls in previous systems, efficiency controls 22B are not statically defined or based on a-priori assumptions of workload. Rather, efficiency controls 22B are designed to minimize the constraints on memory system 12 and maximize the total memory bandwidth available. By maximizing the efficiency, the maximum total amount of work can be performed for any given clock frequency, bus width and memory component. This maximization is performed by utilizing state information of memory controller 12 as well as characteristics of the memory chips 24A-B themselves to select or reorder commands that achieve the minimum memory control overhead and maximize the data transfer cycles on the bus. To this extent, various methods and algorithms could be employed in this and it is not the intent be limited to any single method and/or algorithm. However, one exemplary method/system that could be implemented is shown and described in U.S. Pat. No. 6,240,492 to Foster et al., herein incorporated by reference.

As described above, an efficient memory system 12 receives and processes requests into memory data transfers. Memory system 12 with efficiency controls 22B uses external (request input) and internal state information, as well as defined memory chip characteristics to maximize throughput. The maximum memory bandwidth will be achieved when memory system 12 has the minimum set of constraints placed on it from the external requesters. To achieve maximum efficiency, it may be necessary to lengthen the latency seen by individual components (e.g., 14A-C) attached to the memory system 12. Ideally, all components operate at equal priority such that the requests are processed in an order that provides for maximum data transfer. At times, it could be useful to ignore a component's somewhat higher priority request when an alternative requester would achieve higher efficiency. This is the desired 'normal' ('01' state in FIG. 4B) operating state 102 and the components/system design should attempt to maintain as much time as possible in this unconstrained mode (e.g., pure bandwidth). Given that higher efficiency occurs (for most of the time), all components, even those with potentially slightly higher 'local' priority (which is ignored—for efficiency purposes) will see better performance than a system without efficiency controls 22B since there is more total capacity.

In a system with static allocation or without the dynamic methods described herein to meet the real time needs, it may be necessary to statically define real time components 14A-C as having higher priority than non-real-time components 20A-B, thus introducing a constraint into the memory system 12 dispatch algorithm. This constraint leads to less efficiency, less capacity and thus even though real-time deadlines are met, there is less total memory bandwidth available to non-real-time components 20A-B. In a system using methods described, real-time components 14A-C can operate in low priority and typically will meet their deadlines naturally. However there may be situations of heavy demand placed either on real-time components 14A-C—due to stream encoding variations—or on non-real-time components 20A-B for various reasons—or both types of components such that real-time component starts falling behind. Utilizing methods described herein, the amount of lateness can be analyzed and managed over some period of time and in such a way to gradually and dynamically adjust the operating condition of memory system 12 with efficiency controls. The level and gradation of control is restricted only by implementation, but is typically more than on/off such that memory system 12 may have several types of response. As described above, the 'normal' level is no constraints on memory system 12.

As indicated above, a reasonable implementation would have two additional concern levels above 'normal' operation (e.g., regions 104 and 106 in FIG. 4B). The first level of concern (region 104) from a real-time component would lead to a relatively small constraint on memory system 12. This constraint would be to dispatch all real-time 14A-C and non-real-time components 20A-B, but in a tie, would dispatch to a real-time component over a non-real-time component. Real-time components 14A-C would be dispatched without regard for efficiency, and non-real-time components 20A-B, would still be dispatched based on efficiency. Generally, this should alter the characteristics of the memory system 12 enough that over a period of some number of transactions, the real-time component will transition back into 'normal' mode. Memory system 12 is still operating at good efficiency since all requests are still being honored and rarely should any higher level concerns occur.

The second level of concern (region 104 of FIG. 4B) is defined to handle the situations where, for small amounts of time, several real-time components 14A-C fall behind nearly simultaneously and/or other demands occur relatively close in time. In this situation, one or more real-time components are relatively close to missing a deadline and need to be serviced quickly. Regardless of the efficiency, if the memory system 12 services non-real-time components 20A-B along with real-time components 14A-C, the real-time components 14A-C must wait for the non-real-time components 20A-B to complete their operation. At this concern level, a reasonable response is to block the non-real-time components 20A-B from being dispatched. Since components 20A-B are non-real-time, blocking is not an issue. This allows the memory system 12 to dedicate resources to real-time components 14A-C, which may be accomplished with or without concern for efficiency depending on their relative priority. The overall system efficiency is reduced since there are fewer operations to select from (non-real-time components 20A-B are blocked) and the dispatch may essentially occur based entirely on request input rather than internal state. Though efficiency is reduced, the necessary deadline(s) are met. Typically, this maximum state of concern would only be entered for small amounts of time, and thus the overall average system efficiency is higher utilizing this method.

It should be appreciated that, as indicated above, efficiency controls 22B could be optional. Specifically, memory bandwidth could be dynamically distributed via priority controls 22A by changing priority in response to workload. This would guarantee that the real-time deadlines are met without statically setting the priority as in previous devices. For example, system 10 could attempt to minimize memory system 12 constraints, which could also result in keeping real time components' 14A-C priority low relative to the rest of the components 20A-B. This is useful even in a system 10 without efficiency controls 22B because it would potentially reduce latency that other components experience. Accordingly, it should be appreciated that the present invention could be implemented with only priority controls 22A, only efficiency controls 22B or both priority and efficiency controls 22A-B as shown in FIGS. 1 and 2.

Figure 5:
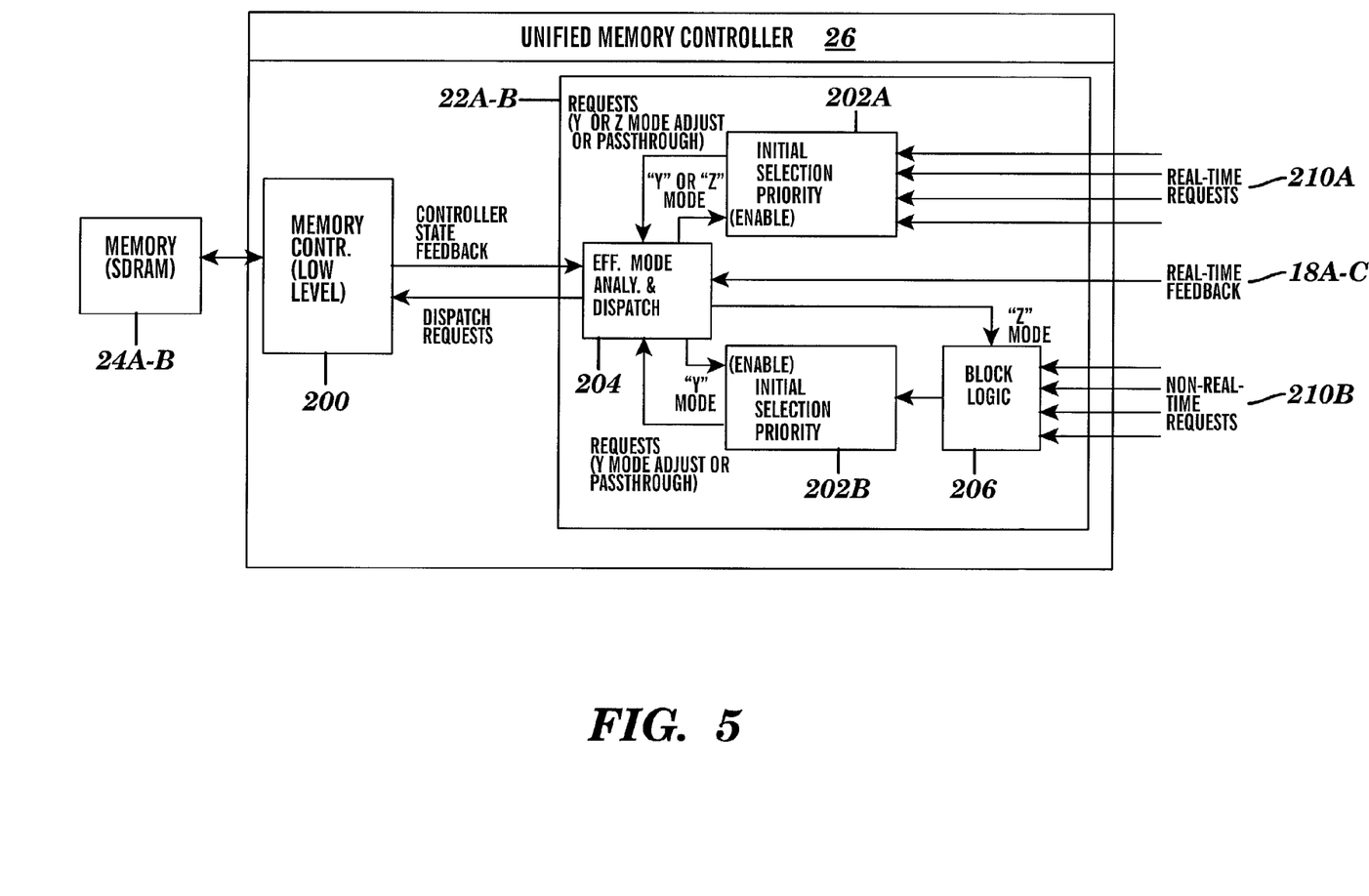
FIG. 5 depicts a more detailed diagram of the priority and efficiency controls of FIG. 1.

Referring now to FIG. 5, an exemplary diagram of priority and efficiency controls 22A-B is shown. As depicted, priority and efficiency controls 22A-B are provided within unified memory controller 26 along with low level memory controller 200, which communicates with memory 24A-B. As depicted, priority and efficiency controls 22A-B include initial selection priority components 202A-B, efficiency mode analysis and dispatch component 204 and block logic 206. Requests 210A-B from real-time components 14A-C and non-real-time components 20A-B are received by initial selection priority components 202A-B. Moreover, feedback 18A-C is received directly by efficiency mode analysis and dispatch component 204 from real-time components 14A-C. If feedback 18A-C indicates that real-time components 14A-C are operating in "normal" mode or are scheduled to meet their deadlines (i.e., "X" feedback), requests 210A-B will be passed to memory controller 200 and processed as normal. Conversely, if feedback 18A-C indicates that real-time components 14A-C are slightly delayed (i.e., the first concern level discussed above or "Y" feedback), a "Y" mode within initial selection priority components 202A-B will be enabled (by efficiency mode analysis and dispatch component 204), and a non-blocking memory bandwidth distribution (priority) will be given to real-time components 14A-C. In the event that feedback 18A-C indicates that severe under performance is occurring (i.e., "Z" feedback), block logic 206 can be enabled (by efficiency mode analysis and dispatch component 204) to block distribution to non-real-time components 20A-B. Accordingly, feedback 18A-C adjusts the operation of efficiency mode analysis and dispatch component 22B to distribute memory bandwidth such that the maximum amount of useable bandwidth (not peak) is available to the system.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for dynamically distributing memory bandwidth, comprising:
a memory system;
a real-time component communicating with the memory system;
a non-real-time component communicating with the memory system; and
a component monitor for measuring a performance of the real-time component and for providing feedback based on the performance to the memory system, wherein the feedback is used to dynamically distribute memory bandwidth between the real-time component and the non-real-time component.

2. The system of claim 1, wherein the system is a closed-loop system, and wherein the feedback is provided in a feedback loop from the component monitor to the memory system.

3. The system of claim 1, wherein the real-time component is selected from the group consisting of a video display component, a video decoding component and an audio component.

4. The system of claim 1, wherein the memory system comprises memory controls.

5. The system of claim 4, wherein the memory controls are efficiency controls that receive and process the feedback to dynamically distribute the memory bandwidth.

6. The system of claim 4, wherein the memory system is a unified memory system that further comprises a unified memory controller and memory.

7. The system of claim 1, wherein the non-real-time component is selected from the group consisting of a central processing unit, a peripheral component, and a graphics renderer.

8. The system of claim 1, wherein the system is implemented in a set-top box.

9. A closed-loop system for dynamically distributing memory bandwidth between a real-time component and a non-real-time component, comprising:
a unified memory system having memory controls;
a plurality of real-time components communicating with the unified memory system;
a non-real-time component communicating with the unified memory system; and
a plurality of component monitors, wherein each of the plurality of component monitors measures a performance of one of the plurality of real-time components and provides feedback based on the performance to the unified memory system, and wherein the feedback is processed by the memory controls to dynamically distribute memory bandwidth between the plurality of real-time components and the non-real-time component.

10. The closed-loop system of claim 9, wherein the memory controls are efficiency controls.

11. The closed-loop system of claim 9, wherein one of the plurality of real-time components is a video display component, and wherein the performance of the video display component is measured based on a quantity of banks that are filled with digital video display data.

12. The closed-loop system of claim 9, wherein one of the plurality of real-time components is a video decoding component, and wherein the performance of the video decoding component is measured based on a quantity of macroblocks that are produced during a decoding of a digital video signal.

13. The closed-loop system of claim 9, wherein one of the plurality of real-time components is an audio component.

14. The closed-loop system of claim 9, wherein the closed-loop system is implemented in a set-top box.

15. A closed-loop system for dynamically distributing memory bandwidth between real-time components and non-real-time components, comprising:
a unified memory system having memory controls;
a real-time video display component, a real-time video decoding component, and at least one non-real-time component communicating with the unified memory system;
a display component monitor for measuring a display performance of the real-time video display component, and for providing display feedback based on the display performance to the unified memory system;
a decoding component monitor for measuring a decoding performance of the real-time video decoding component, and for providing decoding feedback based on the decoding performance to the unified memory system; and
wherein the display feedback and the decoding feedback are used by the memory controls to dynamically distribute memory bandwidth between the real-time video display component, the real-time video decoding component and the at least one of non-real-time component.

16. The closed-loop system of claim 15, further comprising:
a real-time audio component communicating with the unified system memory; and
an audio component monitor for measuring an audio performance of the real-time audio component and for providing audio feedback to the unified memory system, wherein the audio feedback is used by the memory controls to dynamically distribute memory bandwidth between the real-time video display component, the real-time video decoding component, the real-time audio component and the at least one non-real-time component.

17. The closed loop system of claim 15, wherein the unified memory system further comprises a unified memory controller and memory.

18. The closed loop system of claim 15, wherein the decoding performance is measured based on a quantity of macroblock produced by the real-time video decoding component during a decoding of a digital video signal.

19. The closed-loop system of claim 15, wherein the display performance is measured based on a quantity of banks in the real-time video display component that are filled with digital video display data.

20. The closed-loop system of claim 15, wherein the closed-loop system is implemented in a set-top box.

* * * * *